US006498981B1

(12) United States Patent
Adams

(10) Patent No.: US 6,498,981 B1
(45) Date of Patent: Dec. 24, 2002

(54) SYSTEM FOR SEQUENCING TRAFFIC

(75) Inventor: Wayland K. Adams, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/475,914

(22) Filed: Dec. 30, 1999

(51) Int. Cl.[7] ............................ G06F 19/00; G06G 7/76

(52) U.S. Cl. ........................ 701/120; 701/117; 701/121; 701/23; 340/907

(58) Field of Search ................................. 701/117, 118, 701/120, 121, 122, 19, 21, 23; 340/907

(56) References Cited

U.S. PATENT DOCUMENTS 4,825,374 A * 4/1989 King et al. .................... 701/5
5,233,524 A * 8/1993 Jackson ......................... 701/3
5,657,225 A * 8/1997 Bauer .......................... 701/23
5,677,841 A * 10/1997 Shiomi et al. .............. 701/120
5,740,046 A * 4/1998 Elestedt ...................... 701/117
5,740,047 A * 4/1998 Pilley et al. ................ 701/120
5,777,451 A * 7/1998 Kobayashi et al. ......... 318/587
5,916,284 A * 6/1999 Ishihara et al. ............... 701/21
6,006,158 A * 12/1999 Pilley et al. ................ 701/120
6,154,693 A * 11/2000 Aberschitz et al. ........... 701/16
6,249,724 B1 * 6/2001 McCrary ..................... 701/24

OTHER PUBLICATIONS

Adrian Gerold, "pFast and Efficient", Global Airspace Magazine, Sep. 1999, pp. 4–6..

* cited by examiner

*Primary Examiner*—Jacques H. Louis-Jacques
*Assistant Examiner*—Brian Broadhead

(57) ABSTRACT

A system for sequencing traffic for use with various types of vehicles such as air vehicles, land vehicles water vehicles, and railroad vehicles. Virtual containers may be generated that are used to sequence traffic. The virtual containers may be suitably managed to move at a predetermined rate and capacity. Vehicles may be positioned within an empty virtual container. The vehicle will then be managed to stay within the boundaries of the virtual container and thus maintain the desired sequencing of traffic.

11 Claims, 6 Drawing Sheets

SYSTEM FOR SEQUENCING TRAFFIC

BACKGROUND

1. Field of the Invention

The present invention generally relates to sequencing traffic, and more particularly, to sequencing traffic by using a production line approach for improved traffic management.

2. Description of the Related Art

As technology in transportation has evolved, the management of traffic for various modes of transportation has become increasingly complex. For example, air traffic in the United States has dramatically increased to the point where there are tens of thousands of aircraft flights in this country each day. The mandate of providing for safe air travel is charged to air traffic controllers who keep track of aircraft flying within their assigned area and instruct pilots so as to keep the aircraft safe distances apart. While air traffic controllers must direct aircraft efficiently to minimize delays, their paramount concern is safety. However, while the volume of air traffic has increased, the number of air traffic controllers has not increased at the same rate. Thus, controllers are responsible for more and more aircraft.

Air traffic controllers are situated in airport control towers, approach control centers, and enroute centers. Controllers in airport control towers sequence aircraft by guiding and separating the aircraft through landings, takeoffs, and taxiing. Controllers in approach control centers manage the flow of air traffic in the departure and approach area for an airport, while controllers in enroute centers manage the enroute traffic between airports. Control of a specific aircraft is transferred between controllers as the aircraft moves through the various phases of flight. The overall management of air traffic relies heavily on air traffic controllers, and on the instantaneous voice communications between pilots and the air traffic controllers.

Aircraft traffic controllers use radar to track the air traffic in their vicinity. The various types of radar give air traffic controllers the individual identity, location, speed, and altitude of each aircraft under their supervision. The controller will monitor each aircraft individually to ensure that the aircraft maintains a safe distance from other aircraft and obstacles in its vicinity. Frequently as the number of aircraft increases, the controllers find it necessary to use holding patterns and/or extend approach paths in order to safely manage all of the aircraft under their supervision. This creates delays for the aircraft and increases stress for the controllers.

Air traffic controllers must manage aircraft so that a safe distance is maintained between the aircraft. This is done to reduce the risk of midair collisions. Also, if an aircraft gets too close to another aircraft, then wake vortex or wake turbulence can be unsettlingly to one of the aircraft and can contribute to passenger injury or cause the pilot to lose control of the aircraft. With the capabilities of current systems, separation between aircraft is often larger than necessary. As the number of aircraft increases, this larger separation results in an inefficient utilization of runways as the runways will not be operating at full capacity.

A system is thus needed which sequences traffic to overcome the shortcomings of the prior art.

SUMMARY OF THE INVENTION

In accordance with the present invention, a system for sequencing traffic may include generating a plurality of virtual containers that move at a predetermined rate and capacity and managing the movement of the virtual containers. Vehicles, such as air, land, water, or railroad vehicles, may be positioned in one of the virtual containers. The vehicle may then be managed to stay within the virtual container and therefore maintain the desired sequencing of traffic.

In accordance with one aspect of the present invention, the vehicle may be automatically commanded by command data sent to the vehicle by a controller or other monitoring person or application.

BRIEF DESCRIPTION OF THE DRAWINGS

A more complete understanding of the present invention may be derived by referring to the detailed description and claims when considered in connection with the following illustrative Figures, which may not be to scale. In the following Figures, like reference numbers refer to similar elements throughout the Figures.

Figure 2:
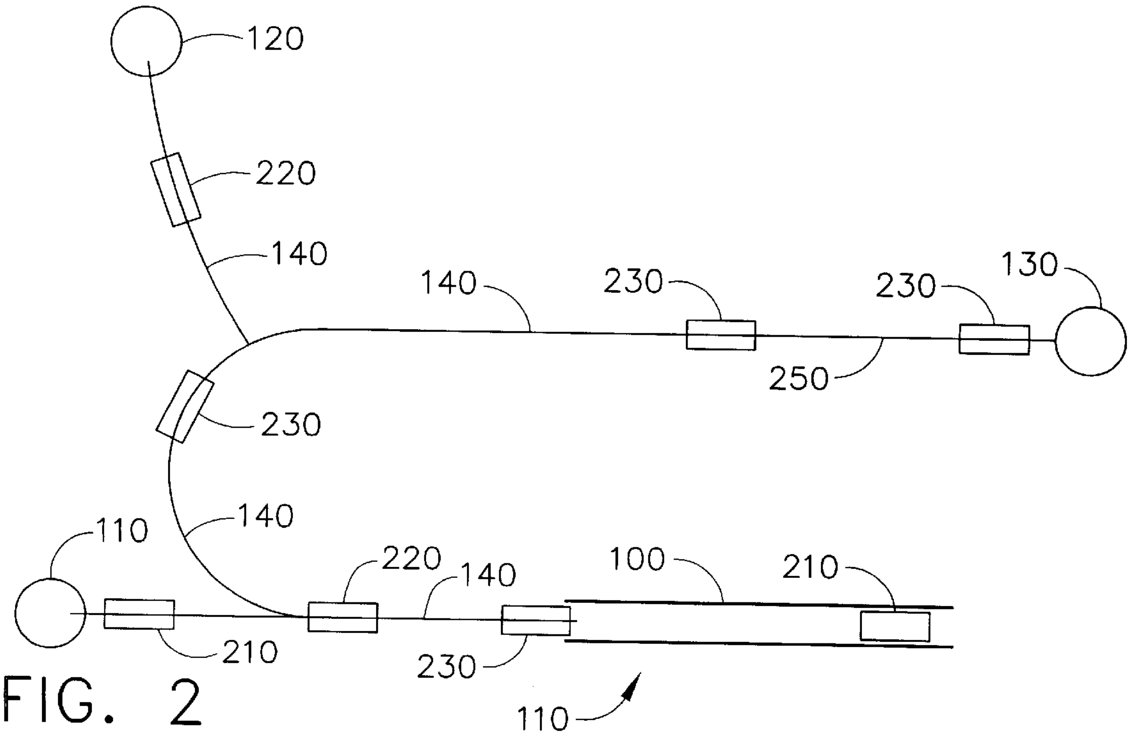
FIG. 2 illustrates the airport of FIG. 1 along with an exemplary orientation of a plurality of virtual containers in accordance with the present invention.
Figure 4:
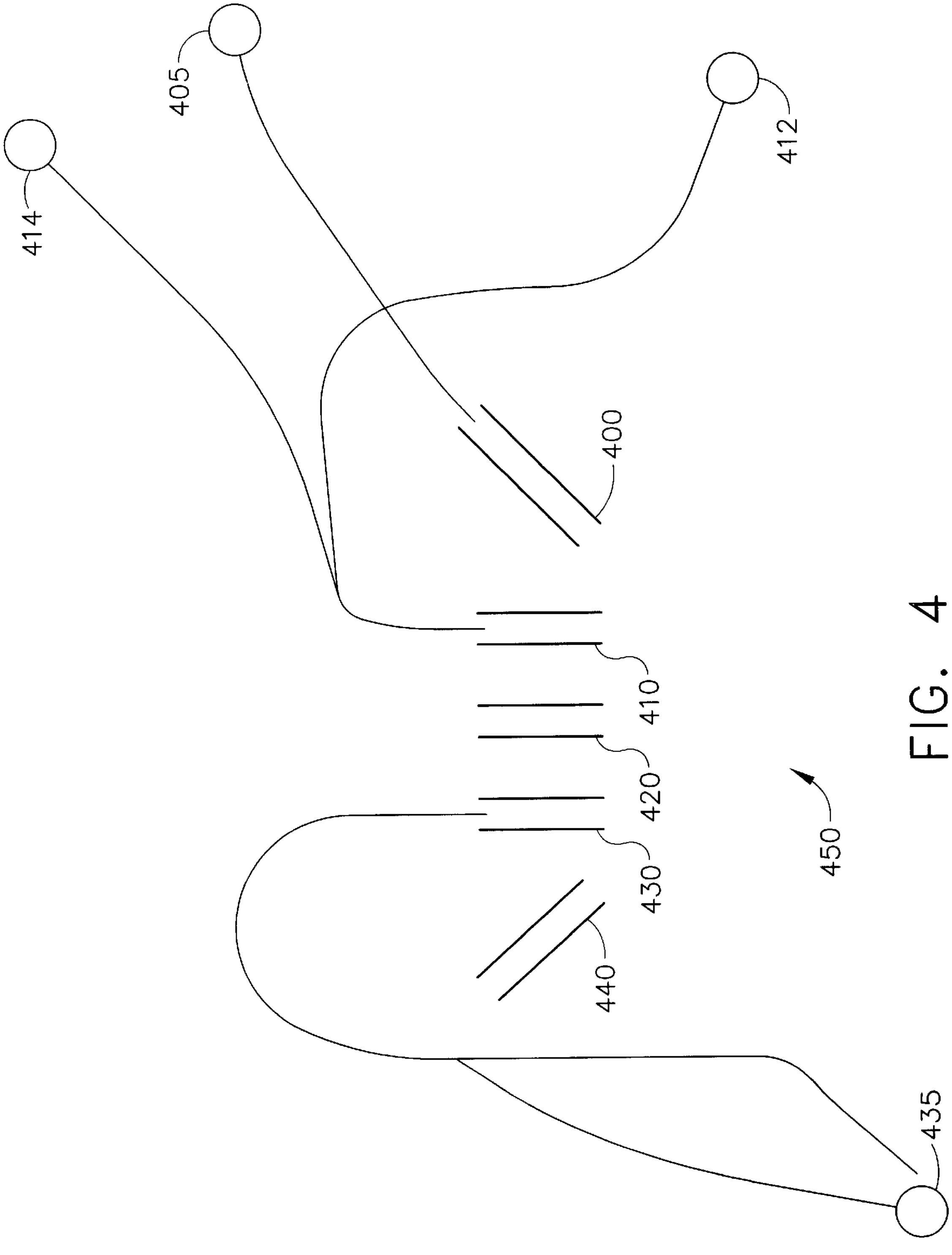
Figure 5:
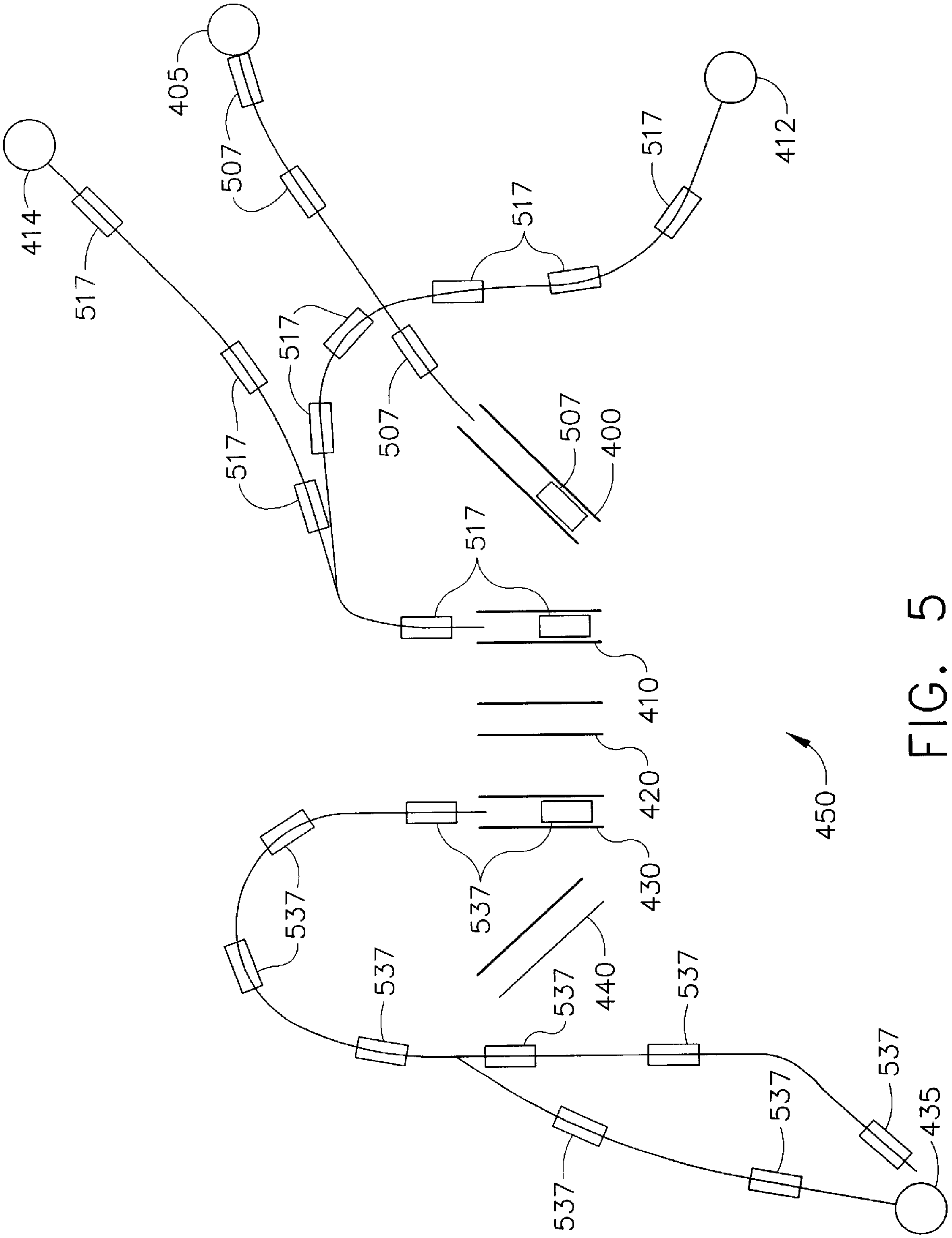
Figure 6:
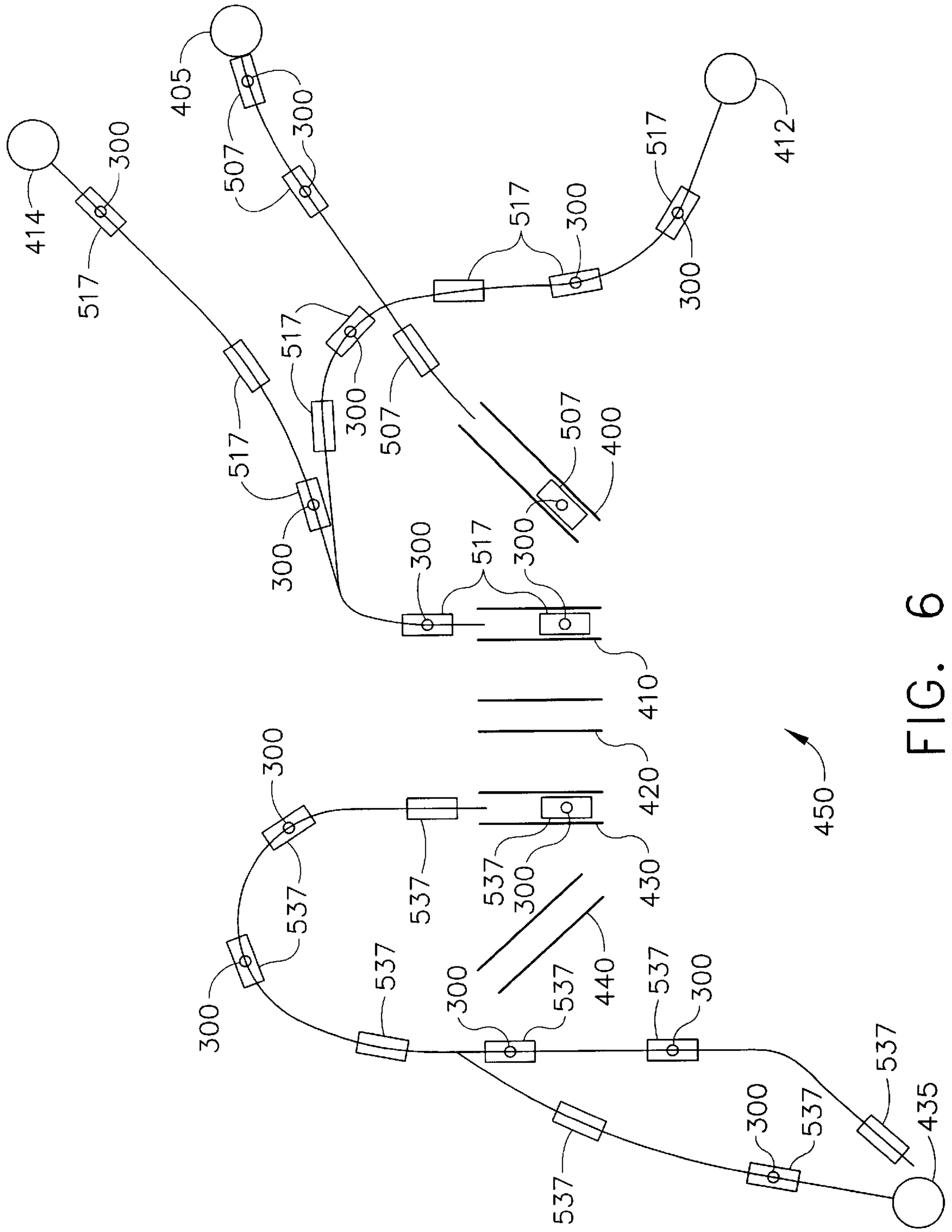
Figure 7:
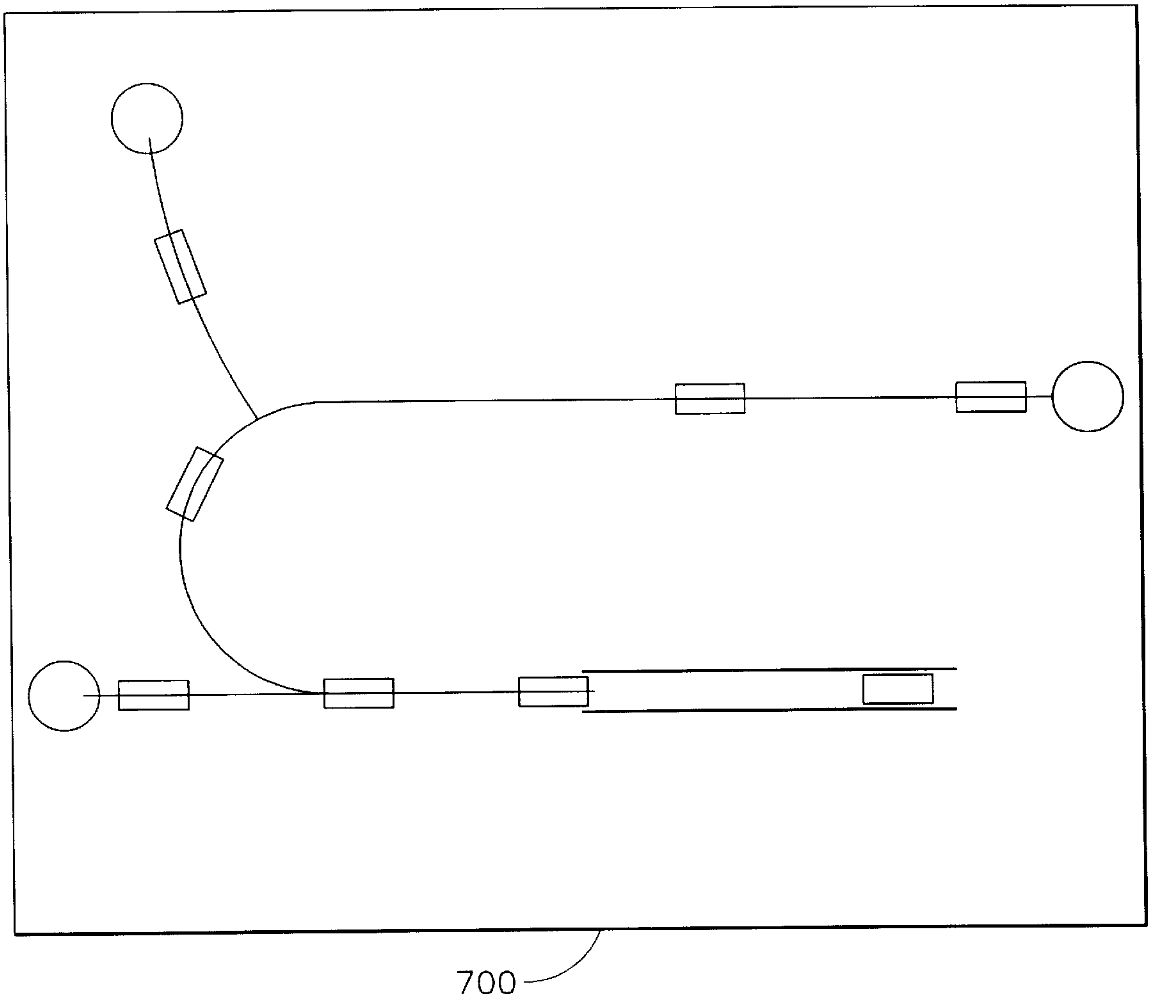

FIG. **3*a* illustrates the virtual containers of FIG. 2**, wherein some of the virtual containers are occupied by aircraft approaching the airport;

FIG. **3*b* illustrates the virtual containers of FIG. 2**, wherein some of the virtual containers are occupied by aircraft departing the airport;

FIG. 4 illustrates a simplified diagram of an exemplary airport with multiple runways;

FIG. 5 illustrates the airport of FIG. 4 along with an exemplary orientation of a plurality of virtual containers in accordance with the present invention;

FIG. 6 illustrates the virtual containers of FIG. 5, wherein some of the virtual containers are occupied by aircraft; and FIG. 7 illustrates a simplified diagram of a controller workstation displaying the virtual containers.

DETAILED DESCRIPTION OF EXEMPLARY EMBODIMENTS

A sequencing system according to various aspects of the present invention provides a system for sequencing traffic that is capable of operating at full capacity and reduces controller workload. Although various aspects of the invention may be used in conjunction with a variety of vehicles such as air vehicles, land vehicles, water vehicles, and railroad vehicles, the present invention is conveniently described below in connection with air vehicles. Air vehicles or aircraft may comprise vehicles such as airplanes, helicopters, or space craft. This exemplary implementation, however, should in no way be construed to limit the applicability of various aspects of the invention in other environments or otherwise limit the claims.

Figure 1:
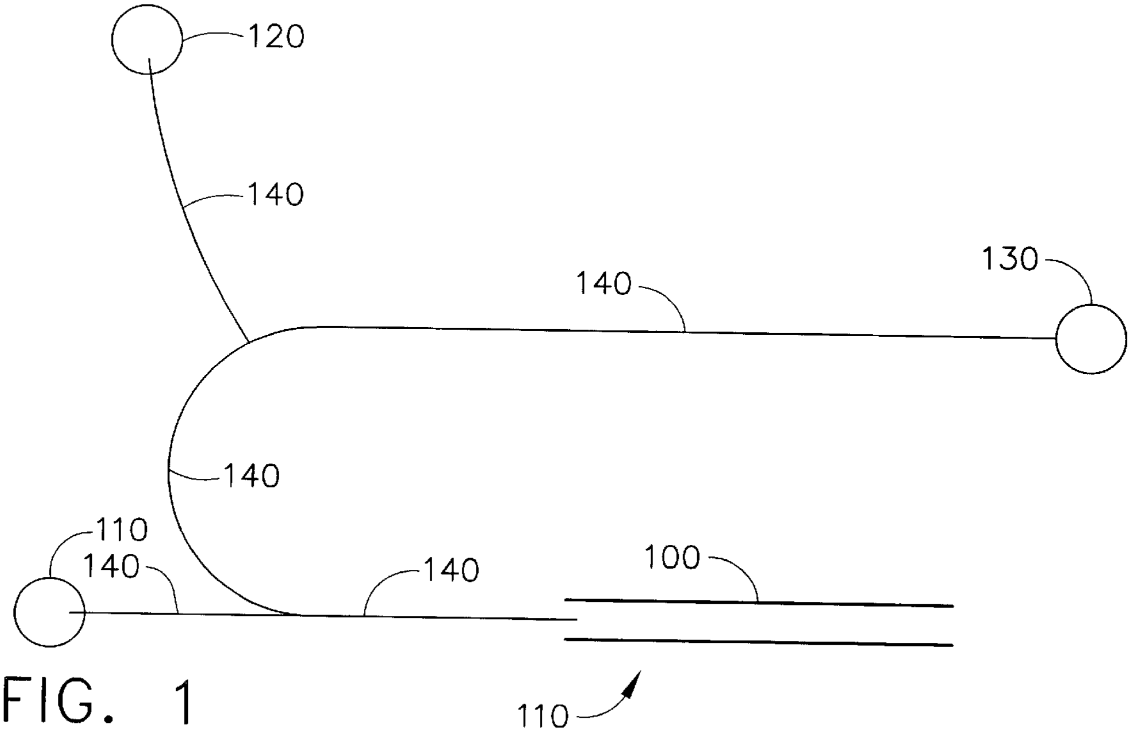
FIG. 1 illustrates a simplified diagram of an exemplary airport with a single runway.

Referring to FIG. 1, an airport 110 with a single runway 100 and approach/departure paths 140 is illustrated. Runway 100 may be used for either takeoffs or landings. Feeder fixes 110, 120, and 130 may be used as entry or departure points for aircraft approaching or leaving runway 100 along paths 140. Although paths 140, as illustrated, are used for both approaches and departures, it will be appreciated that different paths could be used for the approaches and departures, such that the takeoffs and landings occur in the same direction along runway 100. In accordance with the present invention, a plurality of virtual containers 210, 220, and 230 may be generated for sequencing aircraft as illustrated in FIG. 2. Virtual containers 210 correspond to feeder fix 110 (i.e., containers 210 move between feeder fix 110 and runway 100). Similarly, virtual containers 220 correspond to feeder fix 120 and virtual containers 230 correspond to feeder fix 130. The virtual containers illustrated in FIG. 2 are just one of many possible orientations of the containers. Of course, various embodiments of the invention may use any number of runways, feeder fixes, virtual containers, or approach/departure paths.

The virtual containers are three dimensional containers having a height, width and length that is big enough to suitably enclose aircraft and allow for some movement of the aircraft within the virtual containers. While the virtual containers appear as boxes in FIG. 2, it will be appreciated that the virtual containers do not have a tangible presence that can be seen by pilots or others. The virtual containers may be generated by a software application or similar device and displayed onto a computer display such as computer display 700 illustrated in FIG. 7. As illustrated in FIG. 2, virtual containers 210, 220, and 230 are overlaid on top of runway 100 and paths 140.

Figure 3A:
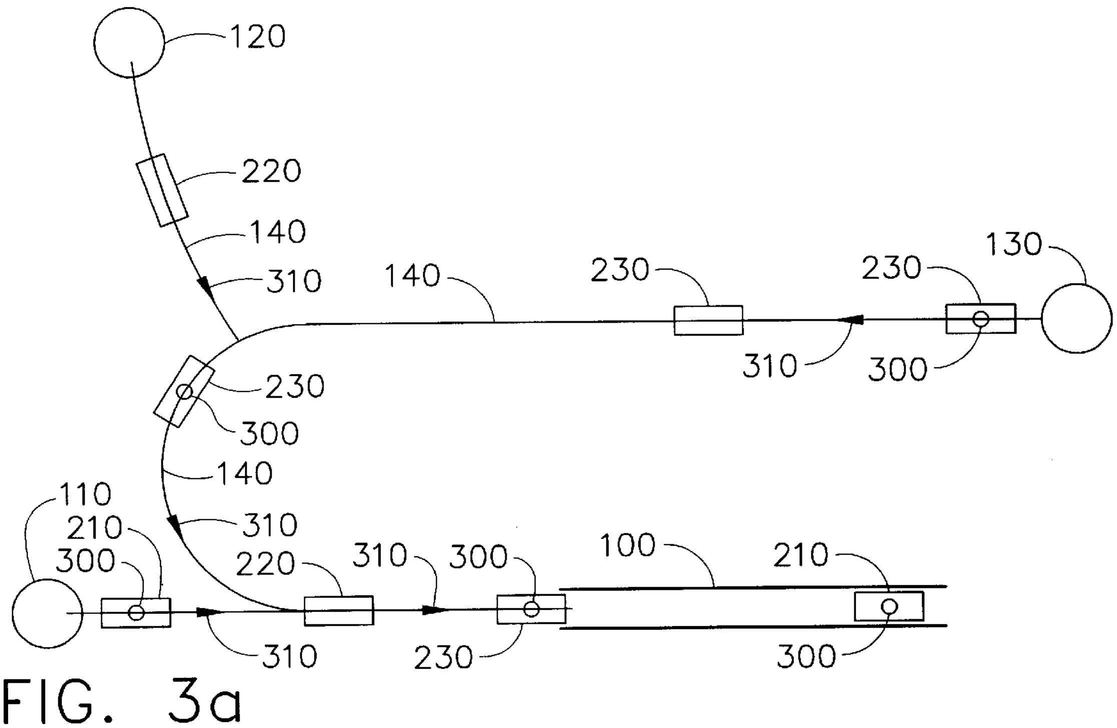

Virtual containers 210, 220, and 230 move along paths 140 at a predetermined rate and spacing which is appropriate for various types of aircraft. The movement of the virtual containers may be managed by a software application or similar device which would update the display of the virtual containers on computer display 700 to reflect the movement of the containers. The predetermined rate of the virtual containers, and the spacing between containers is set such that each container remains clear of other containers. Preferably, the number of virtual containers will enable the runway to be utilized at full capacity. For aircraft that are landing, the virtual containers move from the feeder fixes along paths 140 toward runway 100 in the direction indicated by arrows 310 as illustrated in FIG. 3*a*. For the landing scenario, the feeder fixes may be thought of as the start of a production line wherein the virtual containers move along the production line. New virtual containers will first appear on the display at one of the feeder fixes. Aircraft 300 (depicted with circular icons) may be suitably positioned in virtual containers 210, 220, and 230 for sequencing in accordance with the present invention as described next.

As aircraft 300 approach airport 110 for landing, an air traffic controller monitors the movement of aircraft 300. The air traffic controller will direct aircraft 300 into a suitable empty virtual container by relaying the appropriate navigational information to the pilot of the aircraft. Prior to entering the virtual container, the air traffic controller will preferably direct the aircraft to feeder fix 110, 120, or 130, and the aircraft will enter the virtual container at or near the feeder fix. By using the relayed navigational information, the pilot will be able to position the aircraft into the indicated empty virtual container. Alternatively, the air traffic controller could send command data to the aircraft that would automatically position the aircraft into the indicated container without the need for pilot intervention.

Once the aircraft is within the boundaries of the virtual container, the virtual container will be considered full until the aircraft lands and another aircraft will not be positioned in the full container. After the aircraft has been positioned within the virtual container, the air traffic controller, with the aid of the system (i.e., the computer application or similar device that displays the virtual containers as already described), will manage the aircraft so that the aircraft stays within the virtual container in accordance with the following description. The position of the aircraft in relation to the virtual container could also be supplied to the aircraft allowing the pilot and/or aircraft systems to maintain the aircraft within the virtual container.

In accordance with an aspect of the present invention, each aircraft may have a protected zone and an alert zone that surround the aircraft. The size of each zone will be determined by the aircraft's speed and performance characteristics. For example, a fast moving large aircraft will have larger zones than a slow moving small aircraft. The protected zone is the zone closest to the aircraft. Once the aircraft is positioned within the virtual container, the protected zone of the aircraft can never leave the virtual container. This can be accomplished by utilizing the alert zone which is much larger than the protected zone. When the alert zone of the aircraft comes into contact with or crosses the boundary of the virtual container, then the air traffic controller will provide the appropriate navigational instructions (or send automated command data) to the aircraft. The navigational instructions will be used by the pilot or controller to command the aircraft wto make the appropriate maneuver so that the alert zone of the aircraft will move back within the boundaries of the virtual container. In this manner, the aircraft may be managed to stay within the virtual container. Of course, other embodiments may use different techniques to manage the aircraft to stay within the virtual container.

Figure 3B:
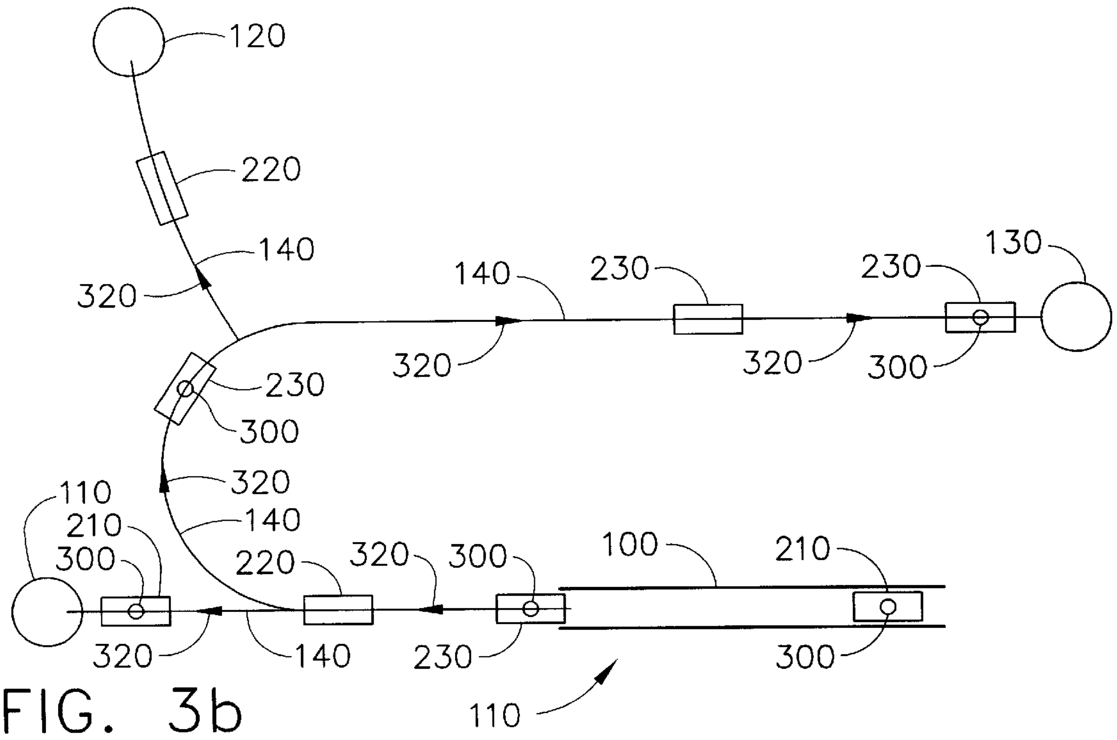

In a similar manner, aircraft may be sequenced during takeoff. Referring to FIG. 3*b*, a plurality of virtual containers 210, 220, and 230 are illustrated overlaying runway 100 and paths 140. Containers 210, 220, and 230 are managed to move at a predetermined rate and capacity (spacing) from runway 100 towards feeder fixes 110, 120, and 130 in the direction of arrows 320. However, it will be appreciated that takeoffs may occur in the opposite direction along runway 100 and virtual containers would then be generated that move from the opposite end of runway 100 towards the same or a different set of feeder fixes. As described above, the virtual containers are managed to move at a predetermined rate and capacity, where the capacity is determined by the spacing between containers.

As aircraft 300 prepares for takeoff from runway 100, an air traffic controller will will direct the aircraft into a suitable empty virtual container by relaying the appropriate information to the pilot of the aircraft. By using the relayed information, the pilot will be able to position the aircraft into the indicated empty virtual container. Alternatively, the air traffic controller could send command data to the aircraft that would automatically position the aircraft into the indicated container without the need for pilot intervention.

After the aircraft has been positioned within the virtual container, the air traffic controller with the aid of the system will manage the aircraft so that the aircraft stays within the virtual container. The position of the aircraft in relation to the virtual container could also be supplied to the aircraft allowing the pilot and/or aircraft systems to maintain the aircraft within the virtual container. Virtual containers may be assigned to a particular feeder fix so that the virtual container will move from runway 100 along path 140 to its assigned feeder fix. For example, containers 210 may be assigned to feeder fix 110, containers 220 may be assigned to feeder fix 120, and containers 230 may be assigned to feeder fix 130. Once aircraft 300 is positioned within a suitable virtual container, aircraft 300 will be cleared of other aircraft as long as aircraft 300 maintains its position within the virtual container. It will be appreciated that this will reduce controller workload and maximize the capacity of the runway as the virtual containers may be generated at a rate that makes maximum use of the runway.

The same computer display could be used to display virtual containers that are used to sequence aircraft for both takeoff and landing. The virtual containers for takeoff could be distinguished from the virtual containers for landing by using a different color, line style, shape, or the like for displaying the different types of containers. Alternatively, the virtual containers for takeoff could be displayed on one computer display, and the virtual containers for landing could be displayed on a different computer display.

In a similar manner, virtual containers may be used to sequence aircraft for an airport with a plurality of runways. FIG. 4 is a diagram of an airport 450 with a plurality of runways 400, 410, 420, 430, and 440. While airport 450 is depicted with 5 runways, it will be appreciated that airport 450 could have any number of runways. Airport 450 has one or more feeder fixes, such as feeder fixes 405, 412, 414, and 435, which are used by inbound aircraft for initial positioning into a virtual container, or are used by outbound aircraft as departure points for leaving their respective virtual container. As described above, with reference to FIG. 5, a plurality of virtual containers 507, 517, 537 may be generated that move at a predetermined rate and capacity between the feeder fixes and the runways. For example, virtual containers 537 move between feeder fix 435 and runway 430, virtual containers 517 move between feeder fix 414 or feeder fix 412 and runway 410, and virtual containers 507 move between feeder fix 405 and runway 400. If the containers are used for departing aircraft, then the containers will move toward the feeder fixes, and if the containers are used for arriving aircraft, then the containers will move away from the feeder fixes. The containers are managed to move at a rate such that each container maintains a safe distance from all other containers at all times. Thus, if aircraft 300 (see FIG. 6) is managed to stay within the boundaries of one of the virtual containers, then aircraft 300 will always be cleared for takeoff or landing.

With continued reference to FIG. 6, aircraft 300 may be positioned into one of the containers as described above. For takeoffs, aircraft 300 will preferably leave the virtual container at the appropriate feeder fix. Similarly, for landings, aircraft 300 will preferably enter one of the virtual containers at an appropriate feeder fix.

The present invention has been described above with reference to a preferred embodiment. However, those skilled in the art having read this disclosure will recognize that changes and modifications may be made to the preferred embodiment without departing from the scope of the present invention. For example, instead of runways, parking spaces for water or land vehicles could be used. These and other changes or modifications are intended to be included within the scope of the present invention, as expressed in the following claims.

What is claimed is:

1. A method for sequencing traffic comprising the steps of:

(a) generating a plurality of virtual containers that move at a predetermined rate and capacity, wherein each of the virtual containers are configured to hold a vehicle;

(b) managing the movement of the virtual containers such that the virtual containers move at the predetermined rate and capacity;

(c) positioning a vehicle in one of the moving virtual containers;

(d) generating a protective zone and an alert zone surrounding each of the vehicles, wherein the alert zone is larger than the protective zone; and (e) managing the vehicle so that the alert zone of the vehicle stays within the moving virtual container.

2. The method according to claim 1, wherein steps (c) and (d) are repeated for a plurality of vehicles.

3. The method according to claim 1, wherein step (c) comprises positioning an air vehicle.

4. The method according to claim 1, wherein step (c) comprises positioning a water vehicle.

5. The method according to claim 1, wherein step (c) comprises positioning a land vehicle.

6. The method according to claim 1, wherein step (c) comprises positioning a railroad vehicle.

7. The method according to claim 1, wherein step (d) comprises sending command data to the vehicle.

8. The method according to claim 1, wherein in the step of generating a plurality of virtual containers, each of the virtual containers is associated with a feeder fix.

9. The method according to claim 1, wherein in the step of generating a plurality of virtual containers, each of the virtual containers is a three-dimensional container having a height, a width, and a length.

10. The method according to claim 3, wherein in the step of generating a plurality of virtual containers, at least one of the virtual containers is used for air vehicles that are taking off and at least one of the virtual containers is used for air vehicles that are landing.

11. The method according to claim 10, wherein in the step of generating a plurality of virtual containers, the virtual containers used for taking off are distinguishable from the virtual containers used for landing.

* * * * *